United States Patent
Cox et al.

(10) Patent No.: US 11,624,561 B2
(45) Date of Patent: Apr. 11, 2023

(54) THERMAL MASS FOR HEAT PRE-LOAD AND TIME-CONTROLLED DISPERSION IN BUILDING HEATING SYSTEMS

(71) Applicant: The Trustees of Columbia University in the City of New York, New York, NY (US)

(72) Inventors: Marshall Cox, New York, NY (US); Ioannis Kymissis, New York, NY (US); John Sarik, New York, NY (US); David Wechsler, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 327 days.

(21) Appl. No.: 14/678,320

(22) Filed: Apr. 3, 2015

(65) Prior Publication Data

US 2016/0290737 A1 Oct. 6, 2016
US 2018/0195809 A9 Jul. 12, 2018

Related U.S. Application Data

(63) Continuation of application No. PCT/US2013/063305, filed on Oct. 3, 2013.
(Continued)

(51) Int. Cl.
*F28D 17/00* (2006.01)
*F28F 1/10* (2006.01)
(Continued)

(52) U.S. Cl.
CPC .............. *F28F 1/10* (2013.01); *F24H 7/0216* (2013.01); *F28D 20/02* (2013.01); *F28F 9/005* (2013.01);
(Continued)

(58) Field of Classification Search
CPC ...... F24H 2250/00; F24H 7/0216; F28F 1/10; F28F 9/005; F28D 2021/0035; F28D 20/02
(Continued)

(56) References Cited

U.S. PATENT DOCUMENTS 224,055 A 2/1880 Tudor et al.
1,288,183 A 12/1918 Price
(Continued)

FOREIGN PATENT DOCUMENTS

EP 0556168 8/1993
GB 759049 10/1956
(Continued)

OTHER PUBLICATIONS

Farid, MM et al. "A review on phase change energy storage: materials and applications" Energy Conversion and Management, 2004, vol. 45; p. 1597-1615.
(Continued)

*Primary Examiner* — Claire E Rojohn, III

(57) ABSTRACT

A heating and/or cooling temperature adjusting apparatus disposed proximate a point of use comprising a heat exchange structure, at least one thermal mass unit comprised of a material which changes phase at a predetermined temperature, and a housing which at least partially encloses the heat exchange structure and thermal mass unit. Additionally, a plurality of thermal mass units can be employed, each with equivalent, or differing, temperature threshold points for conversion between solid, liquid or gaseous phases. The presence of the thermal mass unit at the point of use allows for the heating/cooling system to rapidly adjust the temperature of the room while simultaneously decreasing the duty cycle of the heating/cooling generator (e.g. boiler).

18 Claims, 2 Drawing Sheets

Related U.S. Application Data

(60) Provisional application No. 61/872,634, filed on Aug. 30, 2013, provisional application No. 61/744,853, filed on Oct. 3, 2012.

(51) Int. Cl.
*F28F 9/00* (2006.01)
*F28D 20/02* (2006.01)
*F24H 7/02* (2022.01)
*F28D 21/00* (2006.01)

(52) U.S. Cl.
CPC .. *F24H 2250/00* (2013.01); *F28D 2021/0035* (2013.01); *Y02E 60/14* (2013.01)

(58) Field of Classification Search
USPC .......................................................... 165/10
See application file for complete search history.

(56) References Cited

U.S. PATENT DOCUMENTS

| | | | |
|---|---|---|---|
| 1,782,374 A | 11/1930 | Walls | |
| 1,791,981 A | 2/1931 | Shipp | |
| 1,854,578 A | 4/1932 | Catto | |
| 1,891,169 A | 12/1932 | Mundorf | |
| 2,135,461 A * | 11/1938 | Wooley | F24D 19/0087 454/268 |
| 2,287,045 A | 6/1942 | Lilja | |
| 2,318,875 A | 5/1943 | McAnlis | |
| 2,489,187 A | 11/1949 | Kindt | |
| 2,500,037 A | 3/1950 | Katz | |
| 2,512,661 A | 6/1950 | Marini | |
| 2,656,780 A | 10/1953 | Spieth | |
| 2,731,242 A | 1/1956 | Gustave | |
| 2,765,120 A | 10/1956 | Mascolo | |
| 3,395,752 A | 8/1968 | Fowell | |
| 3,865,969 A | 2/1975 | Mulvey | |
| 4,116,507 A | 9/1978 | Marusiak, Jr. | |
| 4,126,268 A | 11/1978 | Vitale | |
| 4,403,644 A * | 9/1983 | Hebert | F24D 11/0257 165/10 |
| 4,497,438 A | 2/1985 | Ulrich | |
| 4,539,942 A | 9/1985 | Kobayashi et al. | |
| 4,607,791 A | 8/1986 | Gantner | |
| 4,714,194 A | 12/1987 | Eckman | |
| 4,750,546 A | 6/1988 | Godbout | |
| 5,226,592 A * | 7/1993 | Turner | A61L 9/03 236/49.3 |
| 5,228,504 A * | 7/1993 | Mantegazza | B01D 53/265 165/10 |
| 5,454,512 A | 10/1995 | Berlaimont | |
| 5,477,917 A * | 12/1995 | Salyer | A47G 9/0215 165/104.26 |
| 5,646,858 A | 7/1997 | Schrock et al. | |
| 6,003,596 A | 12/1999 | Barba | |
| 6,142,219 A | 11/2000 | Korenic et al. | |
| 6,319,599 B1 * | 11/2001 | Buckley | A41D 31/065 428/308.4 |
| 6,482,332 B1 * | 11/2002 | Malach | C09K 5/066 165/10 |
| 6,808,018 B1 | 10/2004 | Toner | |
| 7,789,129 B1 | 9/2010 | Barden | |
| 7,841,389 B1 | 11/2010 | Barba | |
| 8,347,950 B2 | 1/2013 | Stroobants | |
| 2001/0006102 A1 * | 7/2001 | Nishimura | B01J 35/02 165/81 |
| 2002/0152298 A1 | 10/2002 | Kikta | |
| 2003/0155099 A1 | 8/2003 | Montague | |
| 2003/0230633 A1 | 12/2003 | Rixen | |
| 2004/0123905 A1 | 7/2004 | Petschek | |
| 2004/0222309 A1 | 11/2004 | Skertlch | |
| 2005/0258394 A1 * | 11/2005 | Bacher | C09K 5/063 252/70 |
| 2007/0119958 A1 | 5/2007 | Kates | |
| 2007/0175609 A1 * | 8/2007 | Christ | C09K 5/063 165/10 |
| 2009/0114381 A1 | 5/2009 | Stroobants | |
| 2009/0218087 A1 | 9/2009 | Oshima | |
| 2009/0250189 A1 * | 10/2009 | Soukhojak | C09K 5/063 165/10 |
| 2010/0045470 A1 | 2/2010 | Araiza et al. | |
| 2010/0236595 A1 | 9/2010 | Bell et al. | |
| 2011/0120040 A1 * | 5/2011 | Aiderman | B32B 3/08 52/309.13 |
| 2012/0227926 A1 * | 9/2012 | Field | F24D 11/003 165/10 |
| 2014/0326796 A1 | 11/2014 | Kymissis et al. | |

FOREIGN PATENT DOCUMENTS

| | | | |
|---|---|---|---|
| WO | 2004003451 | 7/2004 | |
| WO | 2009133543 | 11/2009 | |
| WO | 2011058383 | 5/2011 | |
| WO | 2012116322 | 8/2012 | |
| WO | WO 2012166650 A1 * | 12/2012 | ............... F24J 3/083 |

OTHER PUBLICATIONS

Nagano, K et al. "Study of a floor supply air conditioning system using granular phase change material to augment building mass thermal storage- Heat response in small scale experiments" Energy and Buildings, 2006, vol. 38' p. 436-446.
International Search Report PCT/US13/63305.
European Search Report EP 2678621.
International Application Serial No. PCT/US12/026608 Search Report.
Supplementary European Search Report EP 2917670.
Communication from the European Patent Office for European Application No. 12750024.7 dated Nov. 18, 2015.
Final Office Action issued in U.S. Appl. No. 14/001,208 (dated Dec. 28, 2017).
Communication from the European Application No. 12750024.7 dated Jul. 13, 2016.
Communication from the European Application No. 12750024.7 dated Jul. 28, 2017.
International Preliminary Report on Patentability from PCT/US12/026608 dated Aug. 27, 2013.
Second Office Action cited in European Application No. 13843138.2 dated Nov. 27, 2018.

* cited by examiner

THERMAL MASS FOR HEAT PRE-LOAD AND TIME-CONTROLLED DISPERSION IN BUILDING HEATING SYSTEMS

CROSS REFERENCE TO RELATED APPLICATIONS

This application is a continuation of International Application No. PCT/US13/63305, filed Oct. 3, 2013, which claims the benefit of U.S. Provisional Application No. 61/872,634, filed Aug. 30, 2013, and U.S. Provisional Application No. 61/744,853, filed Oct. 3, 2012, the entirety of these applications are hereby incorporated by reference.

BACKGROUND OF THE DISCLOSED SUBJECT MATTER

1. Field of the Disclosed Subject Matter

The disclosed subject matter relates to a system, devices, and methods for improved heating, ventilation and air conditioning.

Particularly, the present disclosed subject matter is directed a heating or cooling system and apparatus which incorporates a thermal mass positioned at or near the point of use of the heating/cooling system.

2. Description of Related Art

A variety of methods and systems heating and cooling the interiors of residential and commercial buildings.

In a conventional steam heating system, a boiler can provide the energy for steam production. The produced steam can then propagate through a steam pipe system, such as for heating a building or other body or substance. This steam can transfer heat through or throughout the system, such as by condensing on one or more cold surfaces and imparting the heat of fusion of the phase change between steam and water. This water can then make its way back to the boiler, such as for heating, and the process can repeat.

In most systems, the boiler can be sized at least large enough to heat the building on the coldest day. As a result, a boiler running full time on normal days would usually overheat a building. Keeping a building at a single temperature can involve the boiler being turned on and off recurrently over time, thereby adjusting its heat production to match the needs of a building. This, however, can be an inefficient mode of operation for a boiler and can result in damage to the boiler itself.

The compromise that can be struck in most steam-heated buildings can be to operate the boiler for a certain portion of a specified time period, such as for a certain portion of every hour, called a duty cycle. Each hour, the boiler can turn on and can heat water to steam. This steam can heat the internal space of the building beyond the target temperature. When the boiler system turns off, the building cools gradually to below the target temperature. The boiler can then turn on during the next hour to repeat this process.

This duty-cycling can result in a constantly changing temperature inside a building, such that overheating can be necessary to, on average, keep a building within a hospitable temperature window. Often, this temperature window can be large and uncomfortable, and the cycling of a boiler can unnecessarily waste energy. In some extreme cases, the boiler of a building can be vastly oversized and, while on, can produce extreme amounts of heat in a short time frame. To compensate, the duty cycle of the boiler can be set very low. This can result in what can be called "shortcycling," a mode of operation that can be particularly inefficient and damaging to the boiler.

Such conventional methods and systems generally have been considered satisfactory for their intended purpose. However, due to an ever increasing demand on utilities and focus on environmental impact and cost savings, an improved heating and cooling system is required which can more rapidly and accurately deliver tempered air at one or more points of use.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

In accordance with an exemplary embodiment of the present disclosure, a temperature adjusting apparatus (e.g. radiator or air conditioner) is disposed proximate a point of use (e.g. locally within the room to be heated/cooled) and comprises at least one heat exchange structure; at least one thermal mass unit, the thermal mass unit comprised of a material which changes phase at a predetermined temperature; a housing, the housing configured to at least partially enclose the at least one heat exchange structure and the at least one thermal mass unit.

The heat exchange structure can include a plurality of fins or tubes, and can be configured as a heating radiator for elevating the temperature external of the housing, or as a cooling radiator for lowering the temperature external of the housing.

The at least one thermal mass unit is composed of a material having thermal conductivity characteristics to maintain a temperature inside the enclosure within a predetermined range for a predetermined time, after operation of the heat exchange structure. In some embodiments the at least one thermal mass unit is composed of a wax or gel. The at least one thermal mass unit can be configured to change phase between a liquid and solid state. Additionally or alternatively, the at least one thermal mass unit can be configured to change phase between a liquid and gaseous state.

In some embodiments the at least one thermal mass unit is sized to extend along the length of the at least one heat exchange structure, and can be disposed within the housing in a configuration which inhibits convection. In some embodiments the housing includes a radiation shield layer disposed proximate the at least one thermal mass unit to inhibit radiation.

Additionally, the at least one thermal mass unit can be disposed within at least one tube, the tube configured with sufficient rigidity to withstand thermal contraction or expansion of the thermal mass unit disposed therein. In some embodiments, a condensation collection reservoir is provided and disposed proximate the at least one heat exchange structure. Furthermore, a fan can be disposed proximate the at least one heat exchange structure and the at least one thermal mass unit.

In some instances a plurality of thermal mass units are disposed within the housing. A first thermal mass unit can have a first phase change temperature, and a second thermal mass unit can have a second phase change temperature. The first thermal mass unit can be disposed on a first side of the heat exchange structure, and the second thermal mass unit can be disposed on an opposite side of the heat exchange structure. Additionally or alternatively, a series of thermal mass units of differing phase change temperatures can be disposed adjacent each other on one side of the heat exchange structure, with adjacent thermal mass units alternating between a low phase change temperature and a high phase change temperature.

Moreover, the system can include a controller circuit configured to control delivery of a heat transfer medium to the heat exchange structure at a duty cycle, the duty cycle specified based at least in part using the at least one thermal mass unit.

In some embodiments, the thermal mass is configured to conform to or match at least a portion of the heat exchange structure dimensions. Additionally, the phase change transition temperature can be selected to maximize heat transfer to air inside the enclosure (facilitate heating of the room), and passively transfer heat through the enclosure to heat the room passively based on average heating demand. The thermal mass composition is selected from a material(s) sufficient to store the requisite amount of heat to maintain a desired temperature in a room of a predetermined size, for a predetermined amount of time.

Also, the thermal mass can be coupled to the heat exchange structure with thermal conductivity characteristics which extract energy from the heat exchange structure into the thermal mass more rapidly than energy is dissipated from the heat exchange structure to the ambient air within the enclosure. Further, an energy source can be disposed external to the enclosure, with the energy source configured to transfer energy into the enclosure and the heat exchange structure and thermal mass disposed therein.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
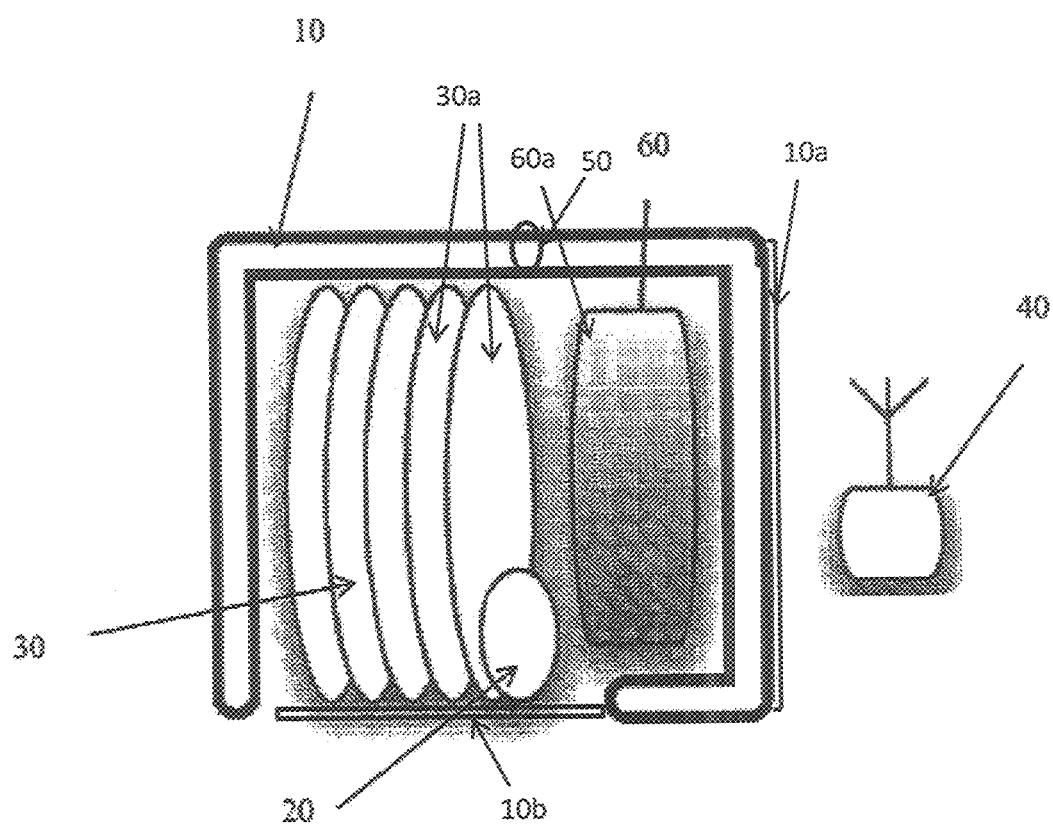
FIG. 1 is a schematic representation of a thermal storage or load management system in accordance with the disclosed subject matter.

Reference will now be made in detail to exemplary embodiments of the disclosed subject matter, an example of which is illustrated in the accompanying drawings. The method and corresponding steps of the disclosed subject matter will be described in conjunction with the detailed description of the system.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

To achieve these and other advantages and in accordance with the purpose of the disclosed subject matter, as embodied and broadly described, the disclosed subject matter includes the integration of a thermal mass into a radiator enclosure or housing (which can be advantageously located at a point of use (POU) such as within a room of a building), such as the radiator enclosure/housing described in International Patent Application No. PCT/US2012/026608, which is incorporated herein by reference in its entirety. This thermal mass, which can be or can include a solid material, a phase change material, or other thermal mass, can allow the storage of heat above the ability of a radiator or other heat exchanger and the enclosure itself. In some embodiments the thermal mass can include combinations of materials (e.g. solid and liquid) such that the thermal mass is not a homogenous composition.

Increasing the thermal mass of a heat exchanging system can allow, for example, one to address some or all of the issues described herein in regard to space heating. In a building in which a boiler is properly sized, but in which a duty cycle causes rooms to overheat hourly, a thermal mass can be used store enough heat, which can be transferred slowly to the room by the radiator enclosure, such as to help keep a room at a constant temperature, despite the duty cycling of the boiler. In a building with an oversized boiler, a thermal mass can allow the boiler to run longer than otherwise (e.g., avoiding short-cycling), and heat can again be transferred to a space over time by the enclosure. Additionally, sufficient thermal mass can be added to allow the storage of significant amounts of heat—such as for allowing a boiler to burn less often, which can increase its efficiency (such as by reducing the heat wasted by flue-gas flushing, which occurs during every boiler firing event). This provides a load management technique for steam-heated buildings—a process in which heat production (and subsequent storage) can be done during a designated time of day, such as when heat is not needed as greatly.

Load management can be particularly important for a central steam system, such as in which a municipality or other entity produces steam at a central location, which steam can then be transferred to individual buildings. Buildings tend to call for heat at the same time of day (6 am, for example), which can cause significant and sudden draw on a centralized system. Accordingly, the load management strategy provided by the localized (i.e. point of use) thermal system disclosed herein for these buildings can help alleviate these issues.

Although particular exemplary embodiments may focus on the heating operation of the disclosed subject matter, it is to be understood that the system and apparatus disclosed herein is equally applicable to cooling or air conditioning operations as well.

Indeed, this type of heat storage can also be used to "store" cold temperatures at the point of use, such as in an air conditioning system. A system similar to the heat radiator enclosure can be used in conjunction with a cooling system, such as to pre-cool a POU thermal mass (e.g., within a radiator enclosure), which can then be used to sink room heat over time, thereby allowing load management with centralized and/or decentralized cooling systems alike. This system can be implemented in a centralized or decentralized manner, and can provide the ability for thermal storage at the point of use.

An exemplary application of the present subject matter includes the use of a thermostatic radiator enclosure (as described below and/or incorporated by reference herein) in conjunction with electric heating (e.g. space heating). The delivered price of electricity to a home, makes it an expensive form of energy to use for heating. However his can change if one can be managed at the consumer end, such as using a thermal mass at or near the point of use—as described herein. For example, this can be accomplished using a Thermostatic Radiator Enclosure (TRE), which allows energy, e.g., in the form of heat, to be stored within a TRE or other enclosure (e.g., at or near a point of use). The stored heat can then be delivered to the space on demand, allowing the offset of this electrical consumption. This energy storage capacity can be helped greatly by the addition of thermal mass to such an enclosure, thereby providing a Ballasted Thermostatic Radiator Enclosure, or BTRE.

Not only does this exemplary embodiment allow the generation of heat in off-peak times for electricity-heated spaces, but it can additionally or alternatively allow load management capabilities to match heat generation to transient power generation times. For example, peak wind energy production correlates with peak heating demand. By using electric heat in conjunction with a BTRE to store the energy, peak energy production can effectively be dumped into electrical heating, which can then be distributed as necessary. This can allow extremely high-efficiency storage of excess electrical energy as heat that can be usefully controllably discharged through the storage enclosure.

The systems and apparatus disclosed herein can also be used for plug-in space heaters. By combining an electric heat pump to be used as a space heater, or a general portable electric space heater, with a BTRE as disclosed herein, a less-expensive heating component can be used to store heat for longer term consumption. This heat generation can also be managed to coincide with off-peak demand.

For instance, the radiator enclosure can include a microprocessor or other controller device that can be internet-enabled or otherwise configured to receive a demand modulation signal, such as from a utility (that uses fossil fuels or electricity). The demand modulation signal can be similar to what a utility can provide to control air-conditioning at different homes so as to reduce peaking in user-demand. In an illustrative example, a utility can provide a 24 Volt demand modulation signal, which can be used as an input by the present radiator enclosure. The provided demand modulation signal may serve to accommodate a variable output of a renewable energy source (e.g., wind energy output can vary depending on wind conditions) and/or it may serve to modulate the demand load on the utility power grid.

Additionally, the radiator enclosure can include a thermal ballast and a computer controlled fan to controllably discharge the thermal ballast. The thermal ballast can be included in the interior of the radiator enclosure. The thermal ballast can be included in a large capacity (e.g., 100 gallon) water tank that can be in fluid communication with the radiator enclosure.

In a boiler system, the radiator loop will have a thermal inertia. While a utility may desire to engage in a program that gives reduced price heat during a certain time of day (e.g., free heat in the mornings), not many buildings can take advantage of this while maintaining comfort of the room occupants. Thus, the present systems, devices, and methods, can provide a way to take advantage of such a utility program, such as by device-controlled convective flow over the radiator, or other device-controlled heat transfer from within an interior of the enclosure to the exterior of the enclosure.

The radiator enclosure systems, devices, and methods described herein can convert a room radiator into a Packaged Terminal Air Conditioner (PTAC), which can be conceptualized as a hot water loop with a fan, where the water can be pre-heated (or pre-cooled), and cycled, but the fan need not be turned on until heating (or cooling) demand is called for. By contrast, with a conventional steam system, if one tries to preheat the loop, energy s transferred to the room immediately, rendering temperature control of the room impractical.

In some embodiments, the microprocessor or other device controlling heat transfer from the interior of the radiator enclosure to the exterior of the radiator enclosure can additionally use room occupancy information (or a pattern of room occupancy information) as an additional input to control storage and/or release of energy. A home and/or apartment internal control system, in combination with local renewable energy supply (e.g., solar, wind, or ground source heat pump), can be used to store locally generated energy at thermal pass at the POU. A thermal mass can be included within the radiator enclosure, wherein the thermal mass can add more thermal mass beyond the thermal mass of the radiator unit itself. Such POU storage is useful in that energy (heat) leakage into the room is still usable.

Furthermore, the microprocessor or other device controlling heat transfer from the interior of the radiator enclosure to the exterior of the radiator enclosure can additionally coordinate such energy storage and/or release with domestic hot water supply and loop. For example, this can include providing a microprocessor or other device-controlled heat exchanger between the domestic hot water supply loop and steam radiator system. In operation, the microprocessor can control energy transfer such as to transfer heat from radiator loop to domestic hot water supply loop to store heat in the domestic hot water supply loop (or vice-versa).

As described or incorporated herein, the heat transfer from a radiator via insulative enclosure can be controlled, such as by providing a controllable fan or louver between the interior and exterior of the enclosure. For example, powering of a fan or opening of a louver can facilitate transfer of heat from the inside of the enclosure to the outside of the enclosure, allowing the control of heat transfer from a radiator (or accompanying thermal mass within the enclosure) to a room.

The heat can be transferred from the interior of the enclosure to the exterior of the enclosure via a medium other than air. For example, such heat transfer can be accomplished thermoelectrically, using a heat pump, or by circulating a heat transfer liquid or other fluid. Thus, instead of including a fan at the enclosure boundary, a thermoelectric heat transfer device, a heat pump, or a liquid pump can be provided, such as at the enclosure boundary.

For example, a heat transfer fluid can be pumped or otherwise circulated from the interior of the enclosure to the exterior of the enclosure, such as to a passive heat sink at the exterior of the enclosure that can transfer heat to the room to heat the room. In some embodiments, heat transfer from interior to exterior of the enclosure can be active, as in the active pumping of a heat exchange fluid (or thermoelectric or heat pump), or passive, such as in which a valve opens and hot liquid (e.g., via convection) is allowed to flow up and out of the enclosure.

In some embodiments, device-controlled or user-controlled heat transfer from within the interior of the radiator enclosure to the exterior of the radiator enclosure can include controllably transferring heat via convection, a fan, a change in an insulating property of the enclosure, liquid heat transfer (e.g., using a liquid loop to transfer heat out from the thermal mass to the radiator enclosure surface), via one or more heat pipes (e.g., duct(s) filled with a phase-change fluid, e.g., picking up heat via evaporation, giving off heat via condensation). The controlled heat transfer can be active (e.g., pumping of fluid or using a thermoelectric heat pump) or passive (e.g., valve opening). For example, a passive convection loop does not need to be powered, a valve can stop flow when you don't want to heat the room.

In accordance with an aspect of the present disclosure, the systems, devices, or methods can provide a full radiator replacement such as for steam (e.g., single and/or two-pipe) and water heating systems. Additionally or alternatively, the present systems, devices, or methods can provide a retrofit to an existing cast iron radiator. In either case, the present systems, devices, or methods can include providing an enclosure, a thermal mass within the enclosure, a controllable heat transfer device to transfer heat across the enclosure boundary or an opening therein, and an optional thermal mass outside the enclosure, such as for further heat storage or release at the point of use.

In an example, such as using the techniques described herein, a radiator can be configured to incorporate heat transfer control, such as via air transfer control (convection, IR, forced air, liquid, etc.) and, e.g., using a high thermal mass material, can be significantly smaller than a standard cast iron radiator while still providing the same or superior energy transfer capability. A standard cast iron radiator in a home is sized for a correct surface area for providing heat to the particularly sized room in which the radiator is located. By using the present techniques, such as providing the radiator enclosure with a processor- or device-controlled fan (or other processor- or device-controlled device) and/or a thermal mass interior to the enclosure and/or exterior to the enclosure a smaller footprint can be obtained.

For instance, a radiator replacement can be configured to include a heat storage chamber that can include a phase change material, which can store a significant amount of heat in a much smaller area and mass than that of a standard cast iron radiator. Phase change materials can include a high specific heat material that can store a lot of energy accompanying a temperature rise, e.g., ethanol, methanol, wax, glycol, water, ammonium chloride, etc. An illustrative example of a phase change material can include paraffin wax. Melting wax stores thermal energy via solid-to-liquid phase change, steam stores thermal energy via a liquid-to-gas phase change. For example, the thermal mass of 10 pounds of paraffin wax can store approximately 1 hour worth of heat, which can be a game-changer for the utility.

Other illustrative examples of phase change materials can include salts, eutectic materials, paraffin waxes, oleic acids. A phase change system can also include a liquid wick system that can use capillary action to move liquid that has undergone a phase change from a solid, or that will undergo a phase change to gas. In an example, the present systems, devices, and methods can store energy using a phase change material that can be selected or configured to change phase at a temperature that is (1) higher than room temperature, and (2) lower than the temperature in the steam loop, e.g., of the boiler system supplying the radiator.

Moreover, the microprocessor-controlled or other device-controlled heat transfer (e.g., via fan, thermoelectric, or other controllable heat transfer technique as described herein) can be coordinated with the radiator heat transfer of the radiator itself. This can improve the performance and/or reduce the mass or bulk required, relative to a standard cast iron radiator.

In an example, the controllable heat transfer between the interior and exterior of the enclosure need not be microprocessor-controlled or other device-controlled heat transfer, but can instead be human user-controlled. Such manual user control can include a zippered enclosure (e.g., a zippered bag over the radiator, where the user can manually control the aperture size. Another example can include manually manipulated louvers that can be adjusted by hand. A combination of manual and device-controlled heat transfer can additionally or alternatively be included.

In another example, the controllable heat transfer between the interior and exterior of the enclosure need not be microprocessor-controlled, but can instead be mechanically actuated, such as using a temperature-actuated valve or other orifice. For example, a triple-duty valve can be used. In a triple-duty valve, one function is as a valve, one function is for closing and/or opening passage, and one function is for establishing different valve positions.

For purpose of illustration and not limitation, an exemplary embodiment of the thermal system incorporating a thermal mass at the point of use in accordance with the disclosed subject matter is depicted in FIG. 1. The thermostatic radiator enclosure or housing 10 is configured to extend around the radiator 20 and heating exchange structure 30. In the exemplary embodiment depicted the housing includes an opening to receive the radiator and heat exchange structure, however alternative geometries and configurations are considered to be within the scope of the present disclosure. External to the enclosure/housing is the radio controlled thermostat 40 and fan 50. Additionally, in some embodiments for operation as a cooling or air conditioning system, the housing 10 can include a condensation collection reservoir 10b disposed under the heat exchange structure and/or thermal mass.

The heat exchange structure 30 can be a plurality of fins (e.g. for electric generated heat) or tubes (e.g. for steam generated heat) 30a with the sufficient surface area to achieve the desired amount of heat transfer to the ambient air. The heat exchanger fins or tubes 30a are schematically shown in FIG. 1. The thermal mass 60 is disposed adjacent the heat exchange structure 30 and within the enclosure/housing 10. The proximity of the thermal mass 60 to the heat exchange structure 30 allows for rapid heating of the thermal mass 60. In some embodiments the thermal mass 60 can be sized/shaped so as to conform or match the shape and contour of the heat exchange structure. This maximizes the amount of surface area in contact and enhances thermal transfer between the thermal mass and heat exchange structure. Furthermore, in some embodiments the enclosure/housing 10 can include a thermal shield layer 10a on the portion proximate the thermal mass 60. This thermal shield inhibits heat loss via radiation from the thermal mass, thereby prolonging the ability of the thermal mass can retain heat. Similarly, the housing 10 substantially covers the heat mass 60 so as to inhibit any heat loss via convection.

The thermal mass 60 can be composed of phase change materials, as discussed above. These phase change materials can be maintained within metal tubing of sufficient rigidity to withstand the stresses imposed by the expansion and contraction generated from the thermal cycling of the phase change material therein. Although only a single thermal mass tube 60*a* is shown in FIG. 1, some embodiments of the disclosed subject matter can employ a plurality of thermal mass tubes. For purpose of illustration and not limitation, an exemplary embodiment of the disclosed system incorporates approximately 10 lbs. of phase change material within four thermal mass tubes. In addition to selecting the number of thermal mass tubes, the thermal mass composition itself can be selected from a material(s) sufficient to store the requisite amount of heat to maintain a desired temperature in a room of a predetermined size, for a predetermined amount of time. In this regard the thermal mass can be optimized and tailored to meet the demands of a specific application.

Figure 2:
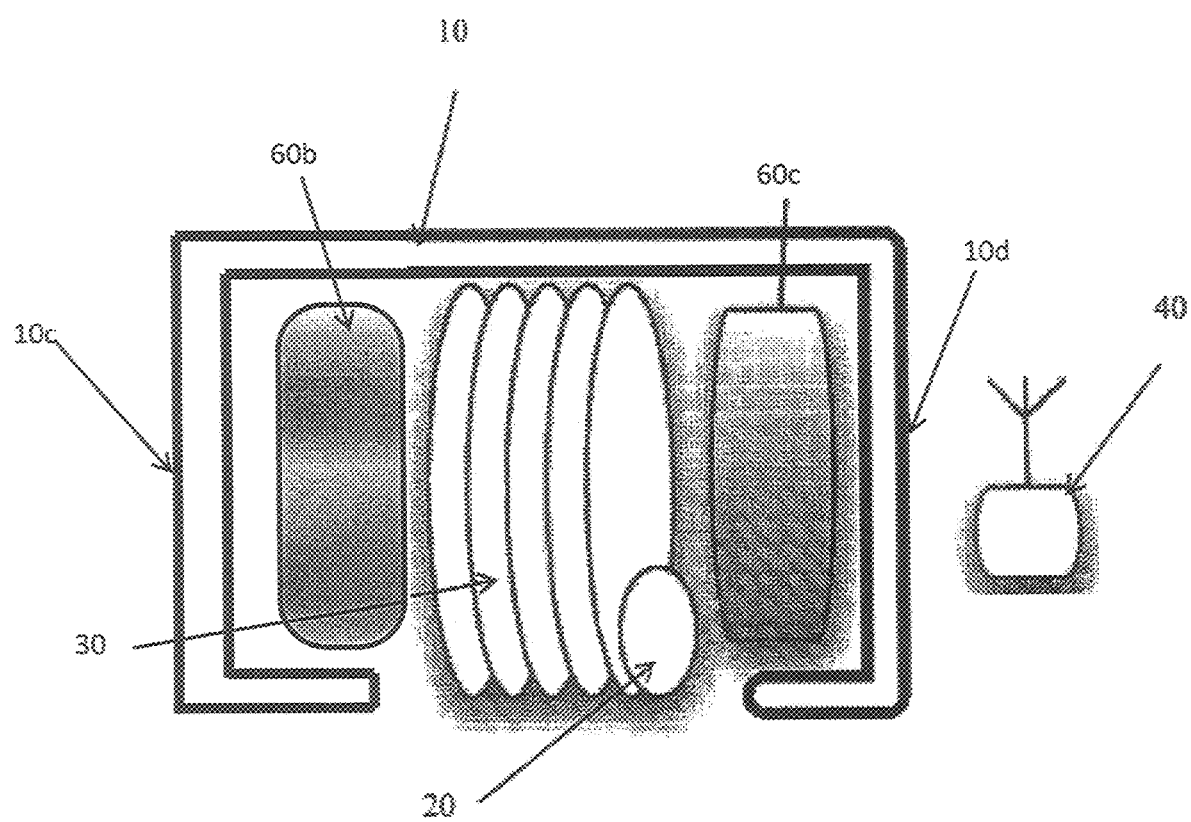
FIG. 2 is a schematic representation of a thermal storage or load management system in accordance with another embodiment of the disclosed subject matter.

In some embodiments multiple thermal mass tubes or units can be employed, with differing types of phase change materials, and/or different transition temperatures such that a first subset of thermal mass tubes is configured to maintain an elevated temperature (relative to the ambient temp) for use in a heating operation, and a second subset of thermal mass tubes is configured to maintain a lower temperature (relative to the ambient temp) for use in a cooling operation. In this regard, the first set of thermal mass units can be provided with a higher phase change temperature than the second set of thermal mass units. Furthermore, the first (hot) subset of thermal mass tubes (thermal unit 60*b*) can be disposed on one side 10*c* of the heat exchange structure 30, while the second (cold) subset of thermal mass tubes (thermal unit 60*c*) can be disposed on one side 10*d* of the heat exchange structure 30 (FIG. 2). Additionally or alternatively, the subsets of differing thermal mass tubes can be interwoven such that adjacent thermal mass units alternate between hot and cold. Additionally, the thermal mass(es) can be coupled to the heat exchange structure with thermal conductivity characteristics which extract energy from the heat exchange structure into the thermal mass more rapidly than energy is dissipated from the heat exchange structure to the ambient air within the enclosure. Also, the phase change transition temperature can be selected to maximize heat transfer to air inside the enclosure (facilitate heating of the room), and passively transfer heat through the enclosure to heat the room passively based on average heating demand.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A system, comprising:
   a thermal mass unit configured to passively extract and store heat emitted by a radiator configured for heating a room;
   a housing containing the thermal mass unit within an interior cavity defined by the housing, the housing and the thermal mass unit collectively configured to be retrofitted to the radiator such that the housing is configured to be positioned to at least partially enclose the radiator; and
   at least one processor configured to operate a fan such that air from outside the housing is pushed inside the housing to be heated, at least in part, by the thermal mass unit,
   the processor, the fan, and the thermal mass unit collectively configured to re-emit heat generated by the radiator and stored within the housing by the thermal mass unit to an exterior of the housing and into the room on-demand.

2. The system of claim 1, wherein the thermal mass unit includes a phase change material.

3. The system of claim 2, wherein the phase change material includes a gel.

4. The system of claim 2, wherein the phase change material is solid at room temperature and configured to at least one of melt or undergo a solid-solid phase change when heated by the radiator.

5. The system of claim 2, wherein the phase change material is liquid at room temperature and configured to boil when heated by the radiator.

6. The system of claim 2, wherein the thermal mass unit is sized to extend along a length of the at least one heat exchange structure.

7. The system of claim 2, further comprising a radiation shield layer disposed between the thermal mass unit and an exterior wall of the housing, the radiation shield layer configured to inhibit radiation from the thermal mass unit to the exterior of the housing.

8. The system of claim 2, wherein the phase change material is within a component configured to withstand thermal contraction or expansion of the phase change material.

9. The system of claim 1, further comprising:
   a condensation collection reservoir disposed under the thermal mass unit.

10. The system of claim 1, wherein the fan is disposed outside and external to the housing and is configured to push the air from outside the housing.

11. The system of claim 1, wherein:
   the thermal mass unit is a first thermal mass unit from a plurality of thermal units disposed within the interior cavity;
   the phase change material is a first phase change material configured to change phase at a first temperature, the system further comprising:
   a second thermal mass unit from the plurality of thermal units and that includes a second phase change material configured to change phase at a second temperature different from the first temperature.

12. The system of claim 11, wherein the first thermal mass unit is on a first side of the heat exchange structure, and the second thermal mass unit is on a second side of the heat exchange structure opposite the first side.

13. The system of claim 1, further comprising:
an energy source external to the housing, the energy source configured to transfer energy to the radiator.

14. The system of claim 1, wherein the thermal mass unit is configured to inhibit convective heat transfer from the radiator when the housing and the thermal mass unit are retrofitted to the radiator.

15. The system of claim 1, wherein the thermal mass unit within the housing is sized and shaped to at least one of conform to or match a size and shape of at least a portion of the radiator when the housing and the thermal mass unit are retrofitted to the radiator.

16. The system of claim 1, wherein the thermal mass unit is integrated into the housing such that the thermal mass unit and the housing are collectively configured to be retrofitted to the radiator.

17. The system of claim 1, wherein:
the radiator has a thermal mass, the thermal mass unit being configured to add thermal mass to the thermal mass of the radiator.

18. The system of claim 1, wherein the radiator is a cast iron radiator, the thermal mass unit and the housing are collectively configured to be retrofitted to the cast iron radiator.

* * * * *